(12) United States Patent
Bender et al.

(10) Patent No.: US 9,975,598 B2
(45) Date of Patent: May 22, 2018

(54) VIBRATION DAMPER WITH LEVEL CONTROL

(71) Applicant: ZF Friedrichshafen AG, Friedrichshafen (DE)

(72) Inventors: Burkhard Bender, Windeck (DE); Holger Kirchner, Ruppichteroth (DE); Nobert Ackermann, Eitorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days. days.

(21) Appl. No.: 15/122,985

(22) PCT Filed: Feb. 9, 2015

(86) PCT No.: PCT/EP2015/052585
§ 371 (c)(1),
(2) Date: Sep. 1, 2016

(87) PCT Pub. No.: WO2015/132044
PCT Pub. Date: Sep. 11, 2015

(65) Prior Publication Data
US 2017/0057591 A1    Mar. 2, 2017

(30) Foreign Application Priority Data

Mar. 4, 2014  (DE) ........................ 10 2014 203 892
Apr. 11, 2014 (DE) ........................ 10 2014 207 055

(51) Int. Cl.
*B62K 25/28* (2006.01)
*B60G 11/58* (2006.01)
(Continued)

(52) U.S. Cl.
CPC ............ *B62K 25/283* (2013.01); *B60G 11/58* (2013.01); *B60G 15/063* (2013.01); *B60G 17/0272* (2013.01); *B60G 17/033* (2013.01); *B60G 17/0565* (2013.01); *F16F 9/096* (2013.01); *B60G 2300/12* (2013.01);
(Continued)

(58) Field of Classification Search
CPC ................................................... B62K 25/283
See application file for complete search history.

(56) References Cited

U.S. PATENT DOCUMENTS 1,426,057 A * 8/1922 Fritz ..................... B60G 17/04
                                                     267/64.16
3,582,106 A * 6/1971 Keijzer ................. B60G 15/12
                                                     267/64.19
(Continued)

FOREIGN PATENT DOCUMENTS

DE    42 31 641     3/1994
DE    103 60 516    7/2005
(Continued)

*Primary Examiner* — Nicole T Verley
(74) *Attorney, Agent, or Firm* — Cozen O'Connor

(57) ABSTRACT

A suspension system includes a spring support for a vehicle support spring. A spring collar supporting the vehicle support spring is selectively adjustable with respect to position by a pressurized-medium supply with the aim of adjusting the level of a vehicle body. The spring support is constructed as a hydropneumatic spring having a hydraulic volume, which can likewise be adjusted relative to a pneumatic storage element.

14 Claims, 2 Drawing Sheets

(51) Int. Cl.
  *B60G 15/06* (2006.01)
  *B60G 17/027* (2006.01)
  *B60G 17/033* (2006.01)
  *B60G 17/056* (2006.01)
  *F16F 9/096* (2006.01)
  *B62K 25/04* (2006.01)

(52) U.S. Cl.
  CPC .... *B60G 2500/30* (2013.01); *B60G 2500/302* (2013.01); *B62K 2025/045* (2013.01)

(56) References Cited

U.S. PATENT DOCUMENTS

| | | | | |
|---|---|---|---|---|
| 3,945,663 | A * | 3/1976 | Duckett | B60G 17/04 188/315 |
| 4,616,810 | A * | 10/1986 | Richardson | F16F 9/42 180/227 |
| 4,639,013 | A * | 1/1987 | Williams | B60G 17/0152 180/41 |
| 5,009,451 | A * | 4/1991 | Hayashi | B60G 17/0272 180/219 |
| 5,299,488 | A * | 4/1994 | Kadlicko | B60G 17/0152 188/266.8 |
| 5,454,452 | A * | 10/1995 | Ohlin | F16F 9/465 188/266.5 |
| 5,486,018 | A * | 1/1996 | Sakai | B60G 17/0416 280/124.16 |
| 5,649,692 | A * | 7/1997 | Gilsdorf | B60G 11/26 267/64.21 |
| 6,076,814 | A | 6/2000 | Grundei | |
| 6,092,816 | A * | 7/2000 | Sekine | B60G 17/0152 267/64.17 |
| 6,318,525 | B1 * | 11/2001 | Vignocchi | B60G 15/063 188/266.6 |
| 6,581,918 | B2 * | 6/2003 | Voelkel | B60G 15/14 188/321.11 |
| 7,374,028 | B2 * | 5/2008 | Fox | F16F 9/44 188/322.13 |
| 7,959,135 | B2 * | 6/2011 | Voelkel | B60G 15/14 267/64.21 |
| 9,062,737 | B2 * | 6/2015 | Hoult | F16F 9/26 |
| 9,114,846 | B1 * | 8/2015 | Ishikawa | B60G 17/0272 |
| 9,452,654 | B2 * | 9/2016 | Ericksen | B60G 17/016 |
| 9,623,713 | B2 * | 4/2017 | Wolf-Monheim | B60G 17/027 |
| 2002/0171187 | A1 * | 11/2002 | Becker | B60G 17/0272 267/218 |
| 2010/0116608 | A1 * | 5/2010 | Runkel | F16F 9/064 188/314 |
| 2016/0363184 | A1 * | 12/2016 | Noguchi | F16F 9/062 |

FOREIGN PATENT DOCUMENTS

| | | | |
|---|---|---|---|
| DE | 10 2004 011632 | 8/2005 | |
| DE | 10 2009 045 051 | 3/2011 | |
| EP | 2 292 504 | 3/2011 | |
| FR | 2 401 037 | 3/1979 | |
| FR | 2 403 223 | 4/1979 | |
| GB | 2 164 417 | 3/1986 | |
| GB | 2 346 346 | 8/2000 | |
| JP | S62 108094 | 7/1987 | |
| WO | WO-2013176091 A1 * | 11/2013 | ............ B62K 25/28 |

* cited by examiner

VIBRATION DAMPER WITH LEVEL CONTROL

CROSS REFERENCE TO RELATED APPLICATIONS

This is a U.S. national stage of application No. PCT/EP2015/052585, filed on Feb. 9, 2015. Priority is claimed on German Application No. DE102014203892.8 filed Mar. 4, 2014; and German Application No. DE102014207055.4 filed Apr. 11, 2014, the contents of which are incorporated here by reference.

BACKGROUND OF THE INVENTION

1. Field of the Invention

The invention is directed to a vibration damper with level control and to a method for the operation of the vibration damper.

2. Description of the Prior Art

In contrast to an automobile, a motorcycle has the peculiarity that a chassis adjustment also influences the seat position. People with short legs must sit comparatively low for standing securely when the motorcycle is stationary. The simplest possibility consists in adjusting the seat to be correspondingly low and considering the chassis separately. The mechanical adjustability of the seat is often very limited.

For this reason, adjustable chassis components are used. Accordingly, it is known from DE 42 31 641 A1 to use an adjustable spring collar for a mechanical spring in the constructional form of a helical compression spring. The spring collar cooperates with an annular piston, which can be adjusted by supplying damping medium. The seat height can also be adapted to a great extent in this way. As the load situation changes, e.g., in case of an accompanying passenger, the required chassis height, and therefore the seat height, can be adjusted through the use of additional pressurized medium, but the driving behavior changes, e.g., with respect to the vibration count, because the vehicle spring is more strongly preloaded.

SUMMARY OF THE INVENTION

It is an object of one aspect of the present invention to achieve an optimization of chassis height and driving behavior.

According to one aspect of the invention, the spring support is constructed as a hydropneumatic spring having a hydraulic volume, which can likewise be adjusted relative to a hydropneumatic means.

Therefore, the suspension system has two parallel suspension arrangements used for different-partial functions. Most of the static basic load is taken over by the adjustable spring collar. The hydropneumatic spring meets the object of adapting to the load to be supported by the suspension system. The total spring rate is given by the sum of the individual spring rates. The eigenfrequency is calculated by the following equation:

$$f = \sqrt{(C_{mechanical\ spring} + C_{hydropneumatic\ spring})/(basic\ load + additional\ load)}$$

$C_{mechanical\ spring}$ is a constant value even when the vehicle support spring is preloaded to a varying extent.

The basic load is defined, for example, as vehicle mass+1 person (75 kg).

The additional load can assume a positive value or a negative value, for example when the person is lighter.

The spring rate $C_{hydropneumatic\ spring}$ can be adapted to the load. Accordingly, the equation contains a variable in the numerator and denominator so that it is possible to limit the eigenfrequency to a narrow bandwidth. In a suspension system without a hydropneumatic means, the eigenfrequency would change appreciably. On the whole, the vibration behavior of the system would change appreciably in this way.

For purposes of a simple implementation of the constructional principle, the pressurized medium for the spring collar adjusting elements and the hydraulic medium of the hydropneumatic spring are identical.

In a further developmental step, it is provided that the suspension system for the spring collar adjusting element and the supply of hydraulic medium for the hydropneumatic spring have a common pressurized medium pump. Components can be economized in this way.

The suspension system in one embodiment has at least two pressurized-medium lines to the adjustable units, an outlet line and a pump line, all of these lines being controllable through a switching valve arrangement.

All relevant states of the suspension system can be tracked very easily through this simple construction of the line connections. For example, the entire suspension system can be blocked when a quasi-static state exists and no pump line is required.

It can be provided that the switching valve arrangement has separate switching valves at least for two pressurized-medium lines. When all of the pressurized-medium lines are outfitted with separate switching valves, every functional control of the spring support can be emulated and comparatively simple switching valves can accordingly be used.

Alternatively, the switching valve arrangement is formed by a switching valve block making possible a simple assembly with few hydraulic port connections.

According to an advantageous aspect, the pressurized-medium line is outfitted with a choke between the annular cylinder and a supply receptacle, which choke is operative at least in direction of flow toward the supply receptacle. The spring collar adjusting element is to be connected to the smallest possible hydraulic volume. This makes it possible to adapt quickly to the required level position. Further, the installation space requirement for the hydraulic system tends to be low. However, when an actual level position is to be lowered, simply letting off hydraulic medium would lead to an unpleasantly abrupt downward movement. This effect is suppressed by the aforementioned choke.

For purposes of a simple sensor technology, the spring collar can be adjusted toward an extension stop. Current in the pressurized-medium pump starts to increase immediately as a stop is approached. This current increase can be used as signal.

In a preferred construction, the axially movable spring collar has a step geometry which, together with a complementary step geometry of the spring support, forms an annular cylinder filled with pressurized medium. In practice, the spring collar forms the piston and the outer cylinder of the annular cylinder.

In a further advantageous configuration, the axially movable spring collar carries two axially spaced annular seals that seal the annular cylinder at the ends. An outer lateral surface, in this case the surface of the spring support, can be produced with a high precision and high surface quality very much easier than an inner lateral surface. The spring collar which slides by its inner wall on the spring collar has axial supporting surface, which need only carry out the preloading for the at least one annular seal.

In a further advantageous configuration, the suspension system has an override circuit for the pressurized-medium supply of the adjustable spring collar. Reaching the required level position quickly is more important to the driver than achieving a constant vibration behavior.

For optimal tracking of the suspension system, the suspension system has a height sensor for acquiring the level position.

For purposes of a compact constructional form of the suspension system, the spring support is constructed as a vibration damper.

To make the best possible use of the suspension system, the vibration damper has at least one adjustable damping valve. Further, the adjustable damping valve can be utilized to assist the leveling control during an oscillating movement in that a particularly soft damping force adjustment is carried out in the intended level direction and a harder damping force adjustment than is necessary is carried out opposite the intended level direction.

According to one aspect of the invention, it is further provided that the hydropneumatic spring is kept constant with respect to spring rate under a constant load and changing driving situation.

There is a predictable ride behavior for the driver even when the vehicle load changes appreciably.

BRIEF DESCRIPTION OF THE DRAWINGS

The invention will be described more fully referring to the following description of the drawings.

DETAILED DESCRIPTION OF THE PRESENTLY PREFERRED EMBODIMENTS

Figure 1:
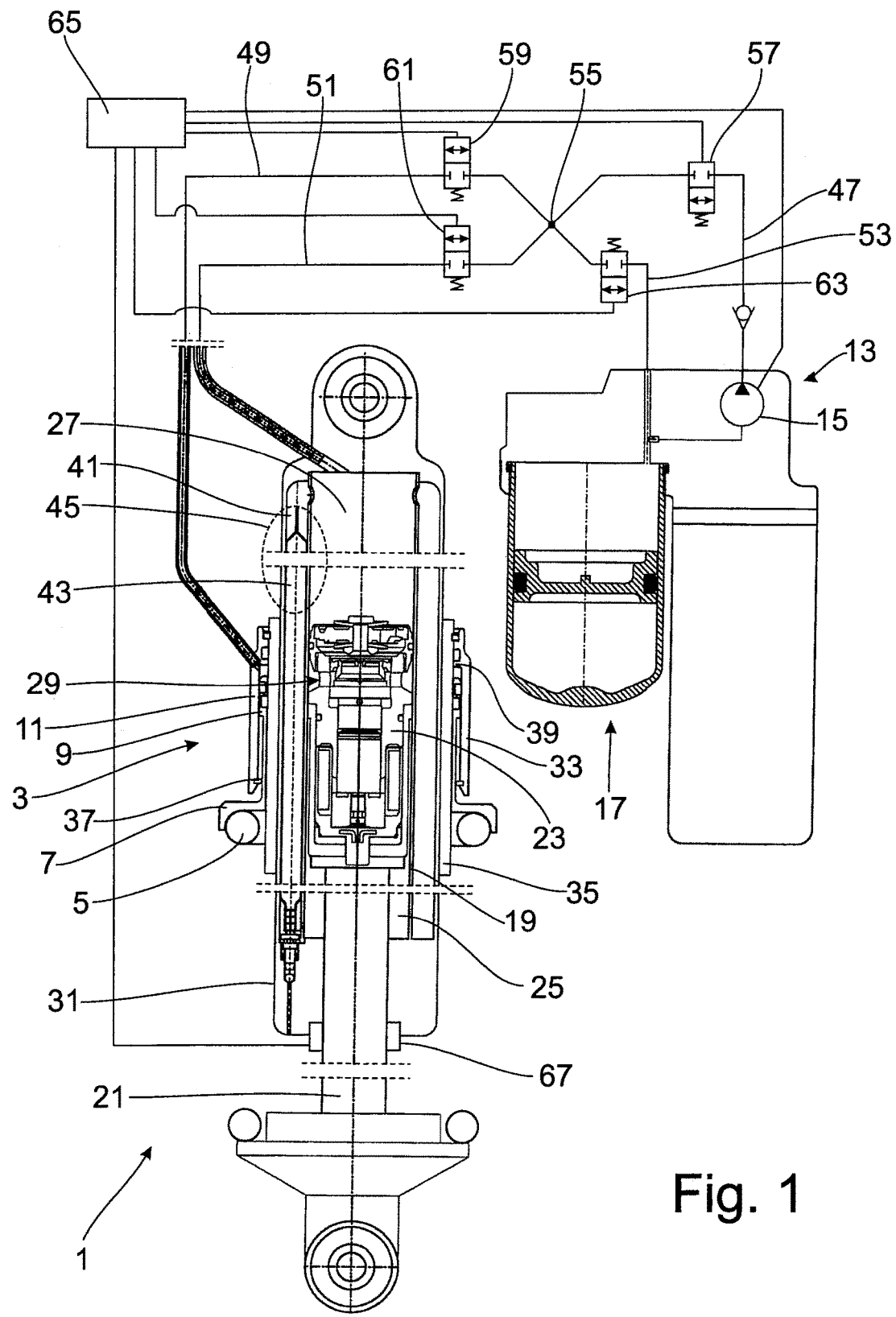
FIG. 1 is a suspension system, particularly for a rear axle of a motorcycle.

FIG. 1 shows a suspension system 1 for a vehicle, particularly a suspension system for a rear axle of a motorcycle. The suspension system 1 comprises a spring support 3 in the constructional form of a vibration damper. A vehicle support spring 5 is supported on a spring collar 7 having an annular piston 9, which is selectively adjustable in an annular cylinder 11 as part of the spring support 3 with the aim of adjusting the level of a vehicle body, not shown, into position. To this end, the annular cylinder 11 has a pressurized-medium supply 13 that comprises at least one pump 15 and a supply receptacle 17. A second spring collar for the vehicle support spring 5 can be mounted on the piston rod side or directly at the vehicle body.

The spring support 3 has a cylinder 19 in which a piston rod 21 is guided so as to be axially displaceable. A piston 23 is fastened to the piston rod 21 and divides the cylinder 19 into working chambers 25; 27 on the piston rod end and remote of the piston rod, respectively. The piston 23 has an adjustable damping valve 29 such as is known, for example, from U.S. Pat. No. 6,119,831. Concentric to the cylinder 19, the spring support 3 has an outer receptacle 31 to which is also fastened the annular cylinder 11, which presents an independent constructional unit in relation to outer receptacle 31, i.e., comprises an outer cylinder 33 and an inner cylinder 35, so that the annular piston 9 does not slide on the receptacle 31 of the vibration damper 3. The annular cylinder 11 has a first stop 37 formed, for example, by a retaining ring that determines the maximum extension position of the annular piston 9. A base 39 of the annular cylinder 11 defines the maximum retracted position of the annular piston 9.

An annular compensation space 41 for the pressurized medium in the working chambers 25; 27, which is displaced by the inward-moving and outward-moving piston rod 21, is arranged between the cylinder 19 and the receptacle 31 of the vibration damper 3. A storage element 43 filled with pressurized gas is arranged in the compensation space 41. Together with the compensation space 41 which is filled with pressurized medium, the storage element 43 forms an adjustable hydropneumatic spring 45 which exerts a force in extension direction of the piston rod 21 functionally parallel to the vehicle support spring 5.

The vibration damper is connected via a pressurized-medium line 47-53 to the pump 15 and supply receptacle 17 such that the spring collar adjusting means 9; 11 and the hydropneumatic spring 45 utilize a common pressurized-medium pump 15. Consequently, the pressurized medium in the annular cylinder 11 is identical to the pressurized medium in the working chambers 25; 27 and in the compensation space 41 of the vibration damper 1. For example, the connection of the pressurized-medium line 51 is carried out in the working chamber 27 remote of the piston rod. Alternatively, the compensation space 41 can also be utilized.

The pressurized-medium lines 49; 51, an outlet line 53 to the supply receptacle 17 and a pump line 47 are connected, for example, at a cross point 55 and have switching valves 57-63 in each instance that carry out an on/off function. Optionally, the suspension system can have an override circuit for the pressurized-medium supply of the adjustable spring collar 7. This override circuit can be triggered by software in a control device 65 or by a conventional hydraulic circuit.

The suspension system 1 has a very simple sensor arrangement for acquiring the position of the annular piston 9. The two stops 37; 39 of the annular cylinder 11 serve as reference points and can be detected, for example, through a current peak in the pump drive 15.

A height sensor 67 suitable for exact measurement is used, for example, for the hydropneumatic spring 45 for acquiring the level position.

When starting the vehicle or motorcycle and, therefore, the suspension system 1, pressurized medium is pumped out of the supply receptacle 17 into the annular cylinder 11 via the override circuit. In this way, the body of the motorcycle is raised until the first stop 37 is reached. The configuration of the vehicle support spring 5 and the basic position of the spring collar 7 are selected in such a way that the vehicle support spring 5 carries most, but not all, of the entire basic load. In this way, it is determined that the annular piston 9 together with the spring collar 7 constantly contacts the first stop 37 to achieve the required level position for a driving operation. A partial amount for the support of the motorcycle body is taken over by the hydropneumatic spring 45. The pressurized-medium supply for the annular cylinder 11 can be blocked via the switching valve 49 and utilized in its entirety for preloading the hydropneumatic spring 45. Accordingly, the piston rod 21 moves farther out until the required level position is reached. The actual level position is acquired by the height sensor 67, which can be constructed in a comparatively simple manner because a quasi-static control is preferably carried out in which the motorcycle is readjusted with respect to its level position to a static vehicle state, e.g., stopped, high speed or all-terrain driving, as the load changes.

When the required level position is reached, the entire pressurized-medium supply can be blocked via the switching valves 47-53 so that no auxiliary power is required for the operation of the suspension system 1. The pumping process for the hydropneumatic spring 45 can be benefitted through the use of the adjustable damping valve 29 in that the damping force is minimized when the piston rod moves out of the cylinder 19 and is maximized when the piston rod moves into the cylinder 19. In this way, the effect of the hydraulic pump can be reinforced and practically no significant energy consumption is needed for this.

When the required level position changes, for example, from all-terrain driving to high-speed driving, the new level position can be achieved by quickly releasing pressurized medium exclusively from the annular cylinder 11. The adjustment of the hydropneumatic spring 45 remains unchanged. The level position changes, but not the vibration behavior, because the eigenfrequency of the suspension system 1 remains unchanged.

If the vehicle load were increased, the piston rod 21 would retract and a deviation from the intended level position would be determined by the height sensor 67. The annular piston 9 further contacts the first stop 37. To achieve the level position, pressurized medium is pumped out of the supply receptacle 17 into the compensation space 41 to increase the preloading on the storage 43 and achieve a greater extension force on the piston rod 21. At the same time, the eigenfrequency is accordingly also raised again to an intended extent.

In principle, it would be possible to utilize the hydropneumatic spring 45 for a changing load and for changing the level position when the driving situation changes. However, it is also expressly provided that the hydropneumatic spring 45 is kept constant with respect to spring rate under constant load and changing driving situation. The change in level position via the annular cylinder 11 is carried out appreciably faster because, owing to the actual dimensioning, less pressurized medium need be used for the change than for altering the preloading of the hydropneumatic spring 45.

Figure 2:
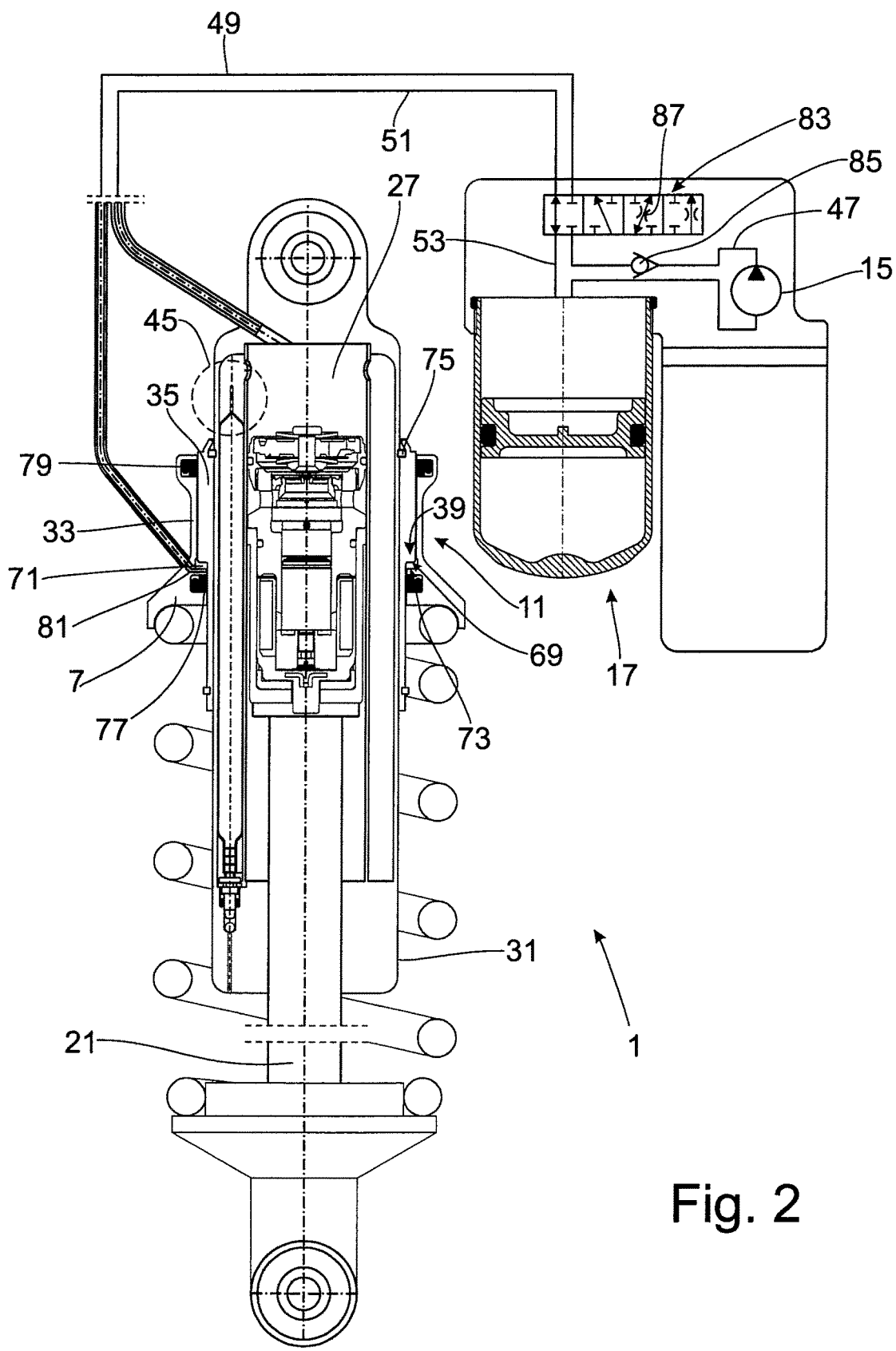
FIG. 2 is an alternative construction to FIG. 1 with a switching valve block.

FIG. 2 shows a modification of the suspension system 1 that follows the same operating principle as the variant according to FIG. 1. A difference with respect to construction is the configuration of the annular cylinder 11. The axially movable spring collar 7 forms the outer cylinder 33 and has a step geometry. The inner cylinder 35 fastened to the receptacle 31 has a complementary step geometry so that the outer cylinder 33 of the spring collar 7 and the inner cylinder 35 of the spring support form the annular cylinder 11 filled with pressurized medium. With its step 69, the inner cylinder 35 forms the base 39 of the annular cylinder 11 which serves for pressure support in the pressurized space 71. A radially inwardly directed step 73 at the end of the outer cylinder 33 or spring collar 7 takes over the function of the piston according to FIG. 1. The axial support of the inner cylinder 35 at the receptacle 31 is carried out via a retaining ring 75 which is clamped in a groove of the receptacle 31.

With its outer lateral surface, the inner cylinder forms a sliding path for two axially spaced annular seals 77; 79, which are supported by the spring collar 7 or outer cylinder 33 in annular grooves and which seal the annular cylinder 11 at the ends thereof. A radial groove 81 in the step 73 of the outer cylinder 33 provides for an incident flow with the hydraulic medium even if the end step 73 of the spring collar 7 should come to rest on the step 69 or the base 39 of the inner cylinder 35.

A further difference with respect to FIG. 1 is the configuration of the switching valve arrangement. In FIG. 1, the switching valve arrangement 57-63 has separate switching valves at least for two pressurized-medium lines and, in a variant, even has a separate switching valve for every pressurized-medium line. In FIG. 2, the switching valve arrangement is formed by a switching valve block 83 with four connections and four switching positions.

In the first switching position shown in the drawing, the working chamber 27 remote of the piston rod is connected to the supply receptacle 17 and the annular cylinder 11 is blocked relative to the supply receptacle and pump. The hydropneumatic spring 45 can relax in direction of the supply receptacle 17. The damping medium displaced by the retracting piston rod 21 can flow off directly into the supply receptacle 17.

The next switching position serves to preload the hydropneumatic spring 45. The annular cylinder 11 or spring collar adjusting element is blocked. The connection of the supply receptacle 17 or the connection between the pressurized-medium lines 49; 53 is also blocked. When the pump 15 is not in operation, the entire suspension system 1 is stopped because the annular cylinder 11 is separated from the pump 15 as well as from the supply receptacle 17 and a reflux from the hydropneumatic spring 45 or from the vibration damper due to a closed check valve 85 between the switching valve block 83 and the pump 15 is likewise blocked. This switching position is particularly relevant for a constant load situation in order to minimize energy consumption.

The third switching position is provided for lowering the level position in which hydraulic medium is to flow out of the annular cylinder 11 into the supply receptacle 15.

In this case, the hydropneumatic spring 45 is blocked and filling by the pump 15 is also blocked. A choke 87 which prevents the spring collar 7 from being lowered too quickly is arranged in the switching valve block 83.

In the fourth switching position, the annular cylinder 11 is filled with hydraulic medium for adjusting the spring collar 7 and the hydropneumatic spring 45 is blocked. The two switching positions 1 and 2 relate to the control of the hydropneumatic spring 45, and switching positions 3 and 4 relate to the control of the annular cylinder 11. Short switching paths are made possible as a result of the grouped arrangement.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A suspension system comprising:
   a vehicle support spring;
   a spring support configured as hydropneumatic spring having a hydraulic volume that can be adjusted relative to a pneumatic storage element and configured to support the vehicle support spring; and a spring collar supporting the vehicle support spring is selectively adjustable with respect to a position by a pressurized-medium supply to adjust a level of a vehicle body.

2. The suspension system according to claim 1, wherein the spring collar adjusting elements and the supply of hydraulic medium for the hydropneumatic spring have a common pressurized medium pump.

3. The suspension system according to claim 2, wherein the suspension system has at least two pressurized-medium lines to the adjustable units, an outlet line, and a pump line, wherein the lines are controllable through a switching valve arrangement.

4. The suspension system according to claim 3, wherein the switching valve arrangement has separate switching valves at least for two pressurized-medium lines.

5. The suspension system according to claim 3, wherein the switching valve arrangement is configured as a switching valve block.

6. The suspension system according to claim 3, wherein the at least one of the at least two pressurized-medium lines to the adjustable units comprises a choke between an annular cylinder of the spring support and a supply receptacle, the choke configured to be operative at least in a direction of flow toward a supply receptacle.

7. The suspension system according to claim 2, further comprising an override circuit for the pressurized-medium supply of the adjustable spring collar.

8. The suspension system according to claim 1, wherein the spring collar is configured to be adjusted toward an extension stop.

9. The suspension system according to claim 1, wherein the spring collar is axially movable and has a step geometry which, together with a complementary step geometry of the spring support, forms an annular cylinder filled with a pressurized medium.

10. The suspension system according to claim 9, wherein the axially movable spring collar carries two axially spaced annular seals that seal the annular cylinder at respective ends.

11. The suspension system according to claim 1, wherein the suspension system has a height sensor configured to acquire a level position.

12. The suspension system according claim 1, wherein the spring support is a vibration damper.

13. The suspension system according to claim 12, wherein the vibration damper has at least one adjustable damping valve.

14. A method for the operation of a suspension system comprising including a vehicle support spring, a spring support configured as a hydropneumatic spring having a hydraulic volume that can be adjusted relative to a pneumatic storage element and configured to support the vehicle support spring and a spring collar supporting the vehicle support spring is selectively adjustable with respect to a position by a pressurized-medium supply to adjust a level of a vehicle body, adjusting the level of the vehicle body; and keeping the hydropneumatic spring constant with respect to a spring rate under constant load and changing driving situation.

* * * * *